(12) United States Patent
Carew

(10) Patent No.: US 6,761,270 B2
(45) Date of Patent: Jul. 13, 2004

(54) WAVE COIL FILTER ASSEMBLY

(76) Inventor: E. Bayne Carew, 7352 Meadowridge Cir., West Bloomfield, MI (US) 48322

( * ) Notice: Subject to any disclaimer, the term of this patent is extended or adjusted under 35 U.S.C. 154(b) by 22 days.

(21) Appl. No.: 09/931,510

(22) Filed: Aug. 16, 2001

(65) Prior Publication Data

US 2002/0020663 A1 Feb. 21, 2002

Related U.S. Application Data

(60) Provisional application No. 60/225,895, filed on Aug. 17, 2000.

(51) Int. Cl.⁷ .............................................. B01D 29/48
(52) U.S. Cl. ................................. 210/352; 210/497.1
(58) Field of Search ................................ 210/108, 304, 210/350, 351, 352, 411, 483, 488, 497.1, 222; 55/520, 299, 304, 475, 498, 521, 529; 411/295

(56) References Cited

U.S. PATENT DOCUMENTS

| | | | | |
|---|---|---|---|---|
| 99,315 | A | * | 2/1870 | Heerance ..................... 411/295 |
| 1,414,132 | A | * | 4/1922 | Hurrell ..................... 210/497.1 |
| 3,542,197 | A | | 11/1970 | Rosaen |
| 3,750,885 | A | * | 8/1973 | Fournier ..................... 210/107 |
| 3,937,281 | A | | 2/1976 | Harnsberger |
| 3,975,274 | A | | 8/1976 | Nommensen |
| 4,113,000 | A | | 9/1978 | Poisson |
| 4,199,454 | A | * | 4/1980 | Sartore ....................... 210/222 |
| 4,227,576 | A | | 10/1980 | Calderon |
| 4,277,261 | A | * | 7/1981 | Miko et al. ................... 96/391 |
| 4,292,178 | A | | 9/1981 | Mori et al. |
| 4,430,232 | A | | 2/1984 | Doucet |
| 4,678,564 | A | * | 7/1987 | Moorehead et al. ........ 210/108 |
| 4,690,761 | A | | 9/1987 | Orlans |
| 4,742,872 | A | | 5/1988 | Geske |
| 4,804,481 | A | | 2/1989 | Lennartz |
| 4,901,987 | A | * | 2/1990 | Greenhill et al. ........... 267/166 |
| 4,938,869 | A | | 7/1990 | Bayerlein et al. |
| 5,152,892 | A | | 10/1992 | Chambers |
| 5,207,930 | A | | 5/1993 | Kannan |
| 5,240,605 | A | | 8/1993 | Winzeler |
| 5,824,232 | A | | 10/1998 | Asher et al. |

FOREIGN PATENT DOCUMENTS

| | | | |
|---|---|---|---|
| EP | 0057670 | 1/1983 | |
| EP | 0159961 | 10/1985 | |
| EP | 0995475 | 4/2000 | |
| GB | 0527259 | 4/1939 | |
| RU | 2077925 C | * 4/1977 | ........... B01D/29/48 |
| WO | 9102578 | 3/1991 | |
| WO | 9307944 | 4/1993 | |

OTHER PUBLICATIONS

PCT International Search Report, International Application No. PCT/US01/25731; International Filing Date Aug. 16, 2001.

English translation to Russian Patent No. 2077925 C1 to Krapukhin.

* cited by examiner

Primary Examiner—Matthew O. Savage
(74) Attorney, Agent, or Firm—Howard & Howard

(57) ABSTRACT

A filter assembly and a method of filtering a fluid using the filter assembly are disclosed. The filter assembly includes wave coils arranged axially to define a filter element. The filter element includes bottom and top ends and an inner cavity. The filter assembly also includes a base plate that engages one, or both, ends to support the wave coils. The fluid flows toward the base plate, and the base plate diverts the fluid inside or outside the inner cavity. The wave coils include crests and troughs engaging one another on adjacent wave coils to define filtration apertures. The diverted fluid is filtered through the filtration apertures such that a filtrate of the fluid passes through the inside or outside of the inner cavity, and a retentate of the fluid is retained on the other of the inside or outside of the inner cavity relative to the filtrate.

8 Claims, 8 Drawing Sheets

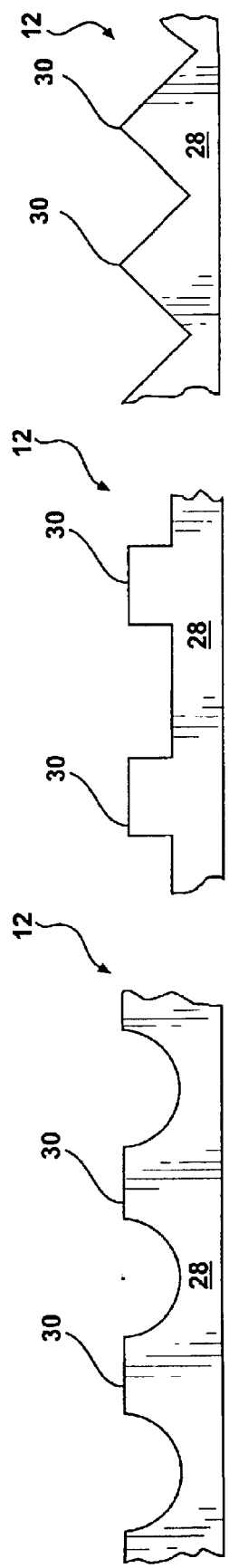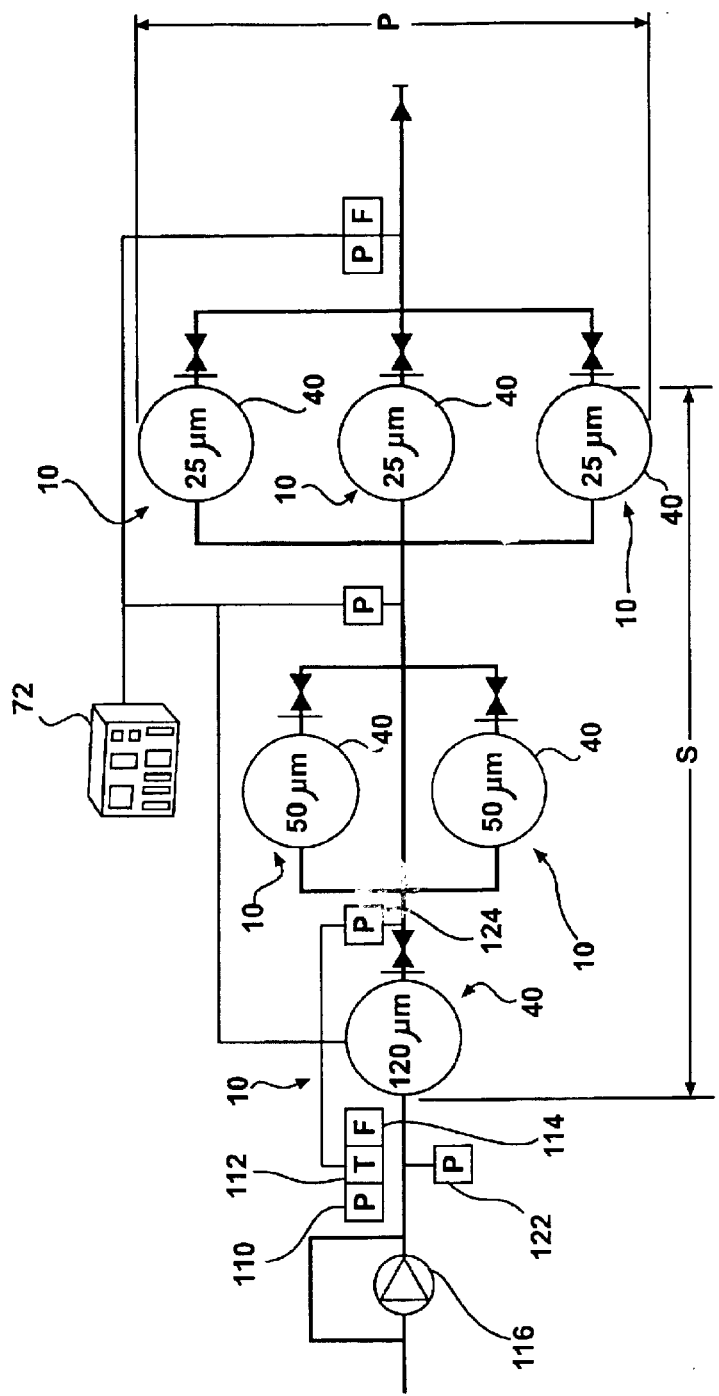

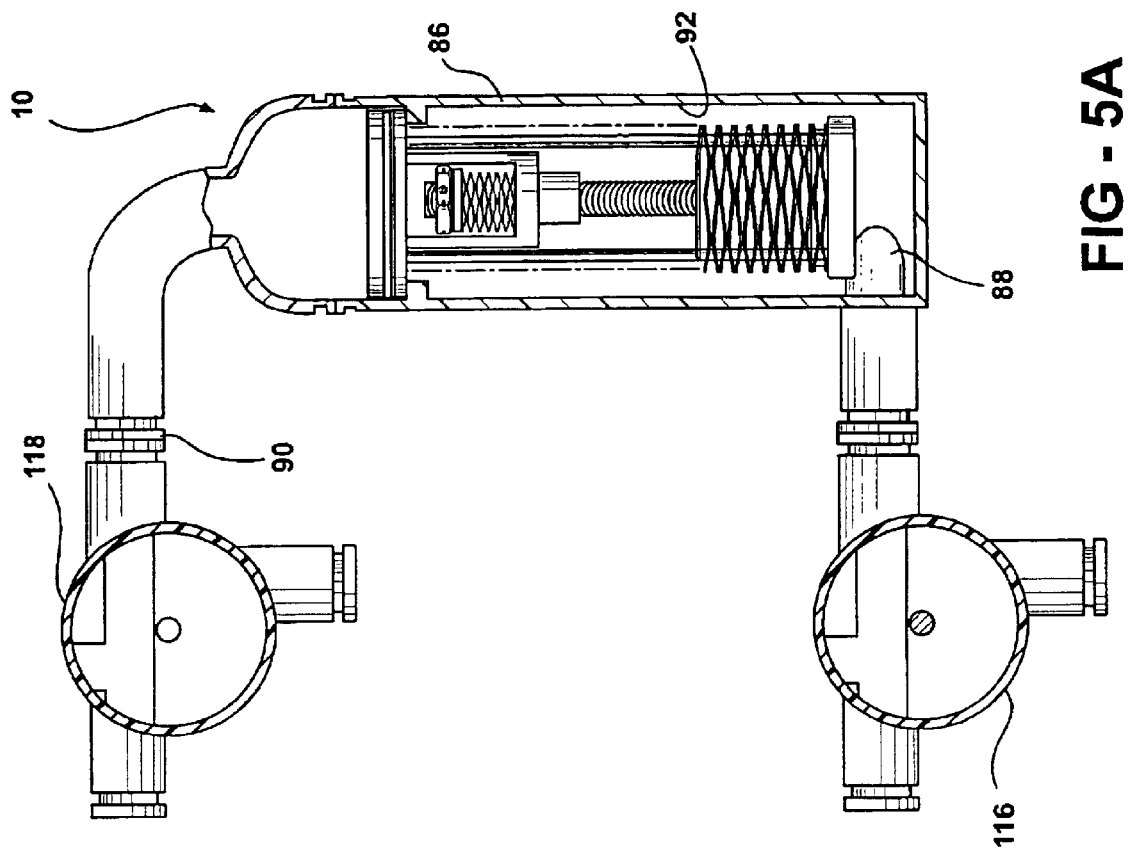
FIG - 5A
FIG - 5B
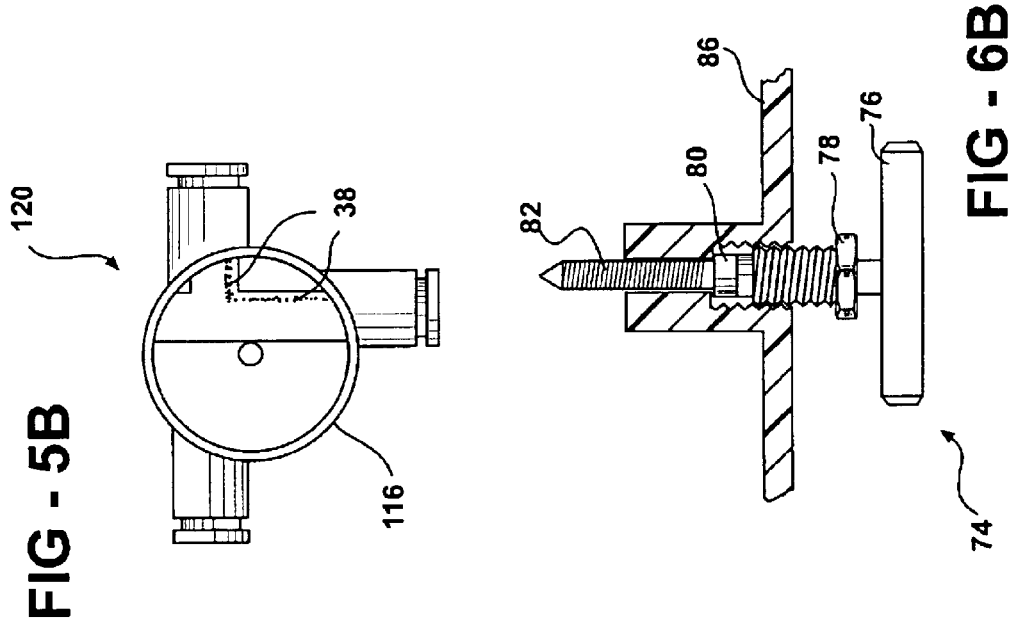
FIG - 6B

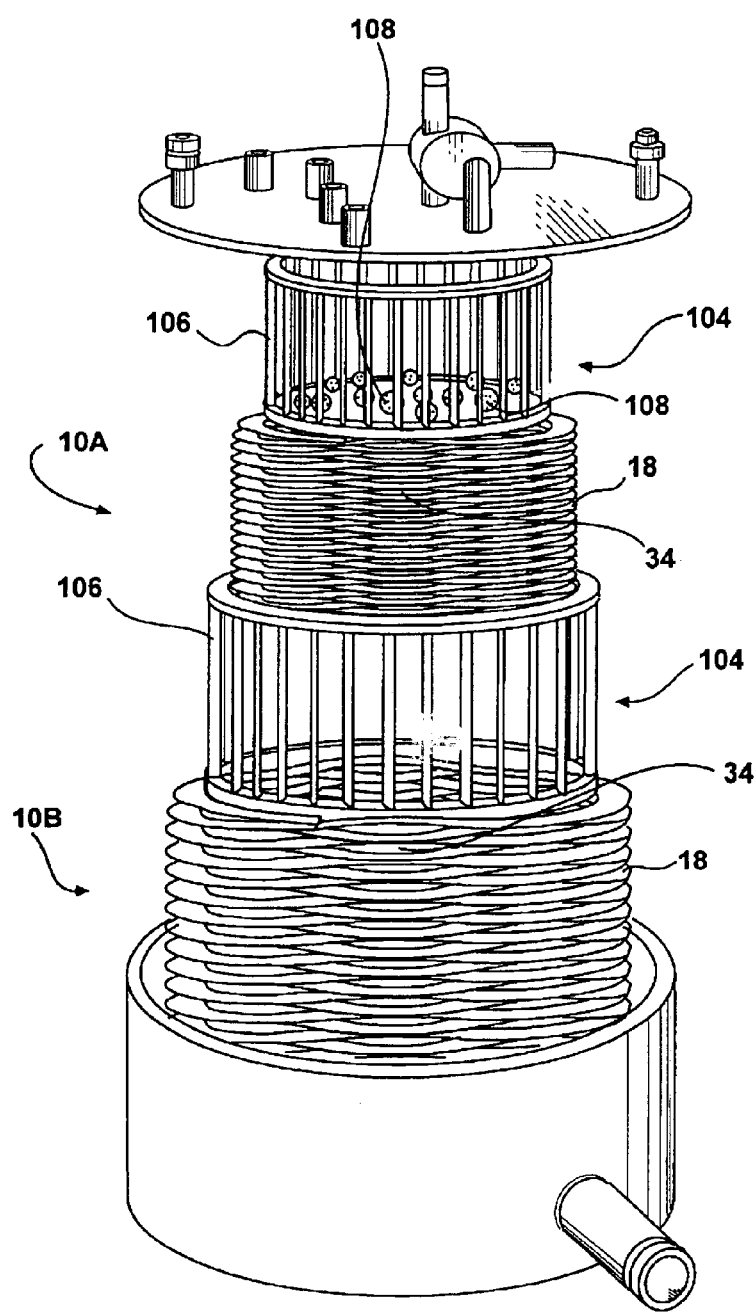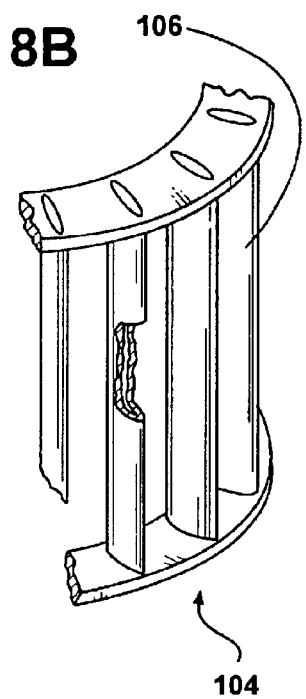

WAVE COIL FILTER ASSEMBLY

RELATED APPLICATIONS

The present application claims priority to and all advantages of U.S. Provisional Patent Application No. 60/225,895, which was filed on Aug. 17, 2000.

BACKGROUND OF THE INVENTION

1) Field of the Invention

The subject invention generally relates to a filter assembly and method of filtering utilizing the filter assembly to filter a fluid. More specifically, the subject invention relates to an adjustable filter assembly including a filter element and filtration apertures that are defined between crests and troughs of adjacent wave coils of the filter element wherein the filtration apertures are adjustable.

2) Description of Related Art

Spring filters are known in the art. Helically- or spirally-wound spring filters are also known in the art. Examples of such conventional spring filters are disclosed in U.S. Pat. Nos. 4,113,000; 4,199,454; and 5,152,892. Conventional spring filters, including the helically- and spirally-wound spring filters disclosed in the above-referenced patents, are deficient for various reasons. For instance, certain conventional spring filters are not adjustable. Other conventional spring filters are not easily adjustable and are not easily manufactured. As one specific example, the conventional spring filter disclosed in the '892 patent is deficient because the entire coil of this conventional spring filter, which is made up of a plurality of individual flat coils, is extremely weak having a k factor of about zero. As a result, filtration gaps, or filtration apertures, can not be maintained between the individual flat coils when the spring filter is vertically-oriented. This conventional spring filter is also particularly difficult to manufacture. More specifically, this conventional spring filter requires that the individual flat coils of the filter be manufactured such that the filtration apertures, between adjacent flat coils progressively increase in size and pitch which, as understood by those skilled in the art, is a particularly cumbersome requirement. This conventional spring filter further requires that projections be machined into each coil to maintain a minimum filtration aperture between adjacent coils of the filter, thus involving additional machining requirements and even limits on size of the spring filter.

Due to the deficiencies identified in the spring filters of the prior art, including those set forth above, it is desirable to implement an adjustable filter assembly that is ideal to manufacture and that uniquely defines a filtration aperture between adjacent coils of a filter element for optimum filtering of fluids due to the adjustability of the filtration aperture. It is also desirable that the adjustable filter assembly according to the subject invention can be easily manufactured into a wide range of sizes and stiffnesses of the filter element.

SUMMARY OF THE INVENTION AND ADVANTAGES

A filter assembly and method of filtering utilizing the filter assembly to filter a fluid are disclosed. The filter assembly includes a plurality of wave coils. The wave coils include at least one crest and at least one trough and are arranged axially to define a filter element. The filter element includes first and second ends and an inner cavity. The filter assembly also includes a support that engages either the first or second end of the filter element for supporting the wave coils. The support also diverts the fluid inside or outside of the inner cavity of the filter element. The crest of one wave coil engages the trough of an adjacent wave coil to define at least one filtration aperture between each crest and each trough of the adjacent wave coils.

The fluid flows toward the support such that the support diverts the fluid to the inside or the outside of the inner cavity of the filter element. The fluid diverted by the support is filtered through the filtration apertures. More specifically, if the fluid flows toward the support and is diverted to the inside of the inner cavity and then through the filtration apertures, then a filtrate of the fluid, which also flows through the filtration apertures, passes through the outside of the inner cavity, and a retentate of the fluid, which cannot flow through the filtration apertures, is retained on the inside of the inner cavity of the filter element. Alternatively, if the fluid flows toward the support and is diverted to the outside of the inner cavity and then through the filtration apertures, then the filtrate of the fluid flows through the filtration apertures and passes through the inside of the inner cavity, whereas the retentate of the fluid is retained on the outside of the inner cavity of the filter element.

Accordingly, the subject invention provides a filter assembly that establishes a filtration aperture between adjacent coils of a filter element included in the filter assembly. Additionally, the filter assembly of the subject invention is easily manufactured.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2B is an enlarged side view of a wave coil having crests and troughs;

FIGS. 3A through 3C are side views of various shearing surfaces of wave coils including a plurality of ridges for enhancing shear forces imparted on a fluid that is to be filtered

FIG. 5A is a partially cross-sectional side view of the filter assembly illustrating an inlet valve disposed at an inlet of the filter canister and an outlet valve disposed at an outlet of the filter canister;

FIG. 5B is a schematic representation of a backwash position of the inlet valve at the inlet of the filter canister;

FIG. 6B is a enlarged, partially cross-sectional view of the manual adjustment assembly that may be utilized in the adjustment mechanism;

FIG. 8A is an exploded perspective view of two filter assemblies in a nested configuration where one filter assembly is disposed concentrically about another filter assembly;

FIG. 8B is an enlarged perspective view of a baffle cage included in the nested configuration of FIG. 8A where individual baffles are hollow such that a filtration additive can be delivered to the filtration apertures;

FIG. 9 is a schematic view of filter assemblies arranged in parallel and in series and illustrating a controller in communication with the filter assemblies;

DETAILED DESCRIPTION OF THE PREFERRED EMBODIMENT

Figure 1A:
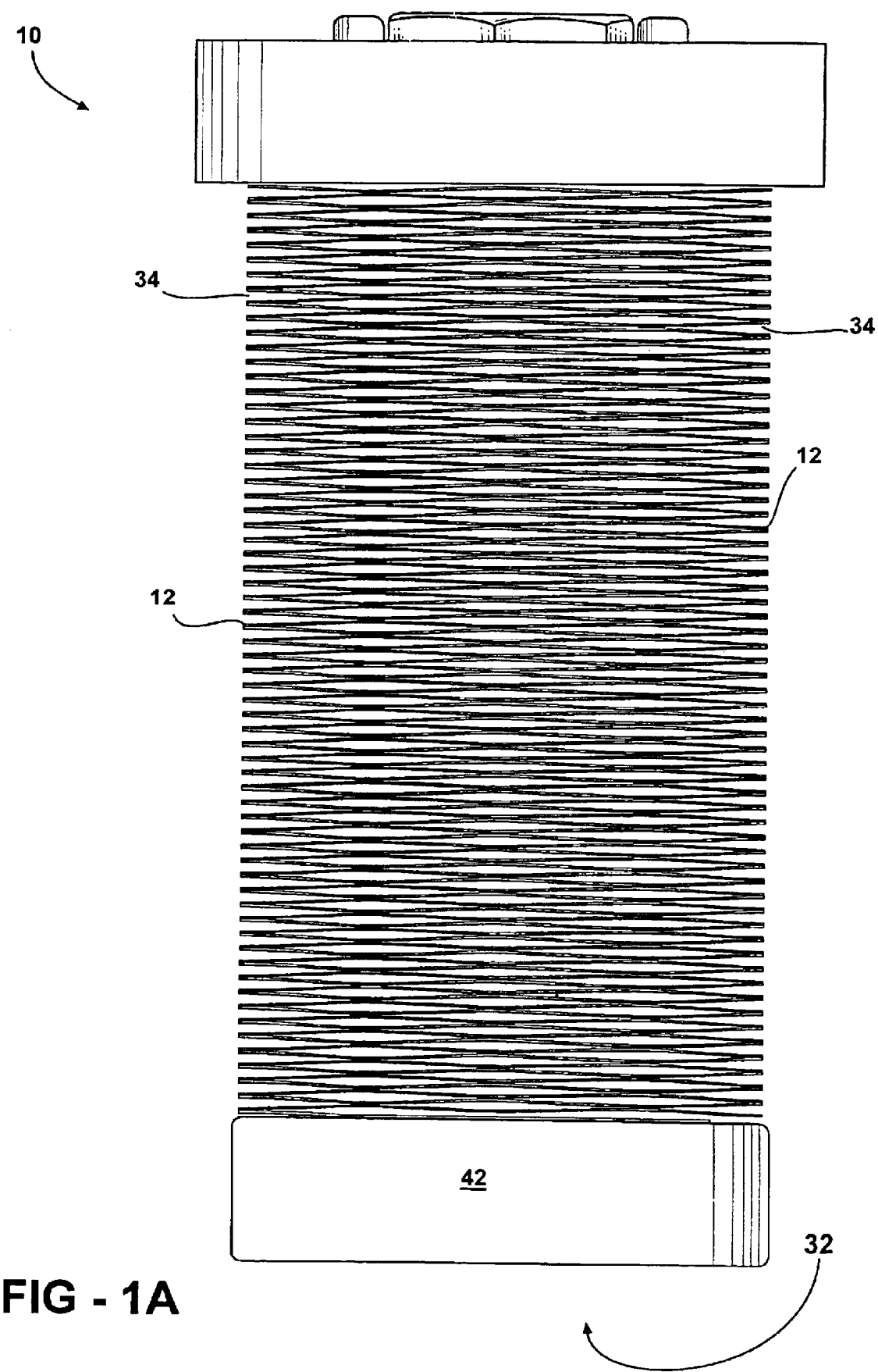
FIG. 1A is a side view of a filter assembly illustrating a plurality of filtration apertures defined between crests and troughs of adjacent wave coils of a filter element of the assembly.
Figure 2A:
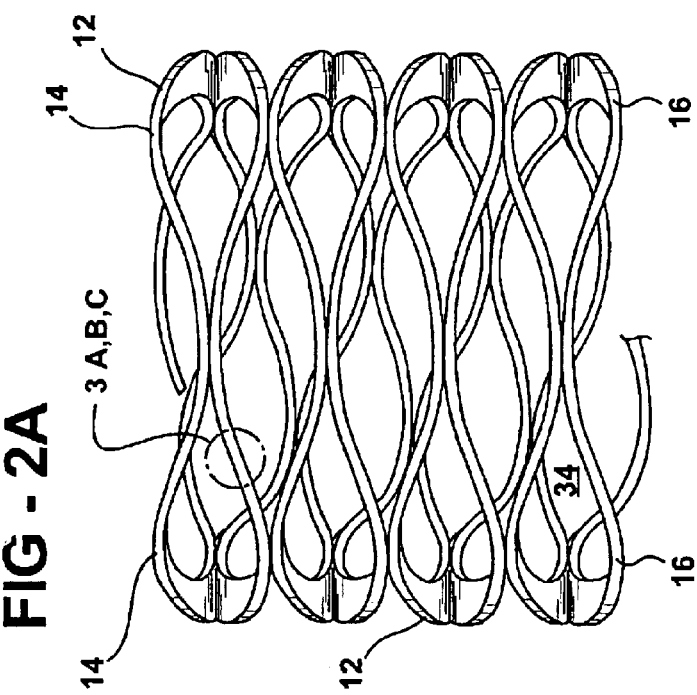
FIG. 2A is an enlarged side view of a portion of the filter element.
Figure 2A:
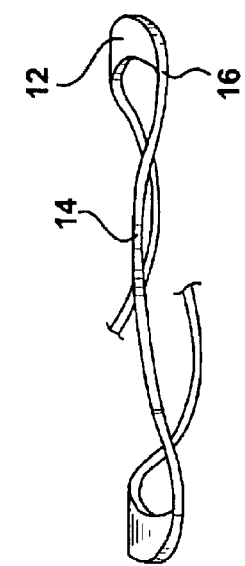
Figure 1B:
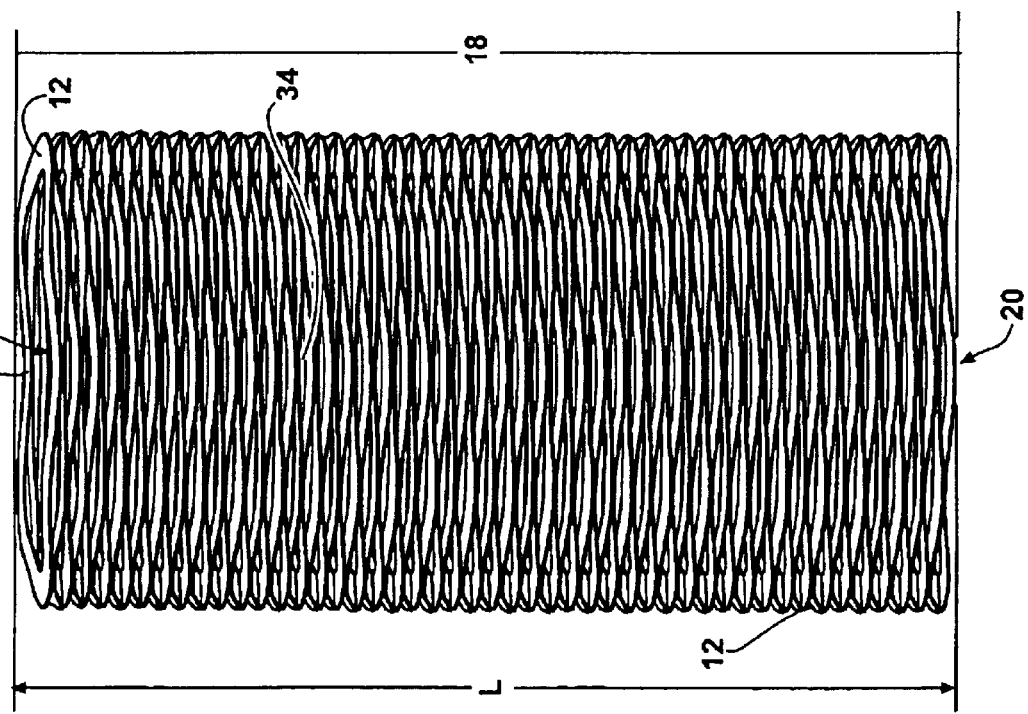
FIG. 1B is a perspective view of the filter element of the assembly illustrating the plurality of wave coils arranged axially and defining an inner cavity.

Referring to the Figures, wherein like numerals indicate like or corresponding parts throughout the several views, a filter assembly for filtering a fluid is generally disclosed at 10. It is to be understood that the filter assembly 10 and method of filtering according to the subject invention are capable of filtering both liquids and gases as the fluid. The filter assembly 10 of the subject invention is most preferably used to filter fluids having solid particles including, but not limited to, slurries of biological waste. As such, the filter assembly 10 is commonly used in combination with such devices as shaker screens, steam scrubbers and/or strippers, biofilters, conveyors, and as a component in mobile filtration units.

As shown best in FIGS. 1A through 2B, the filter assembly 10 includes a plurality of wave coils 12. The plurality of wave coils 12 are formed from individual flat wave coils 12. The wave coils 12 include at least one crest 14 and at least one trough 16 and are arranged axially to define a filter element 18. Although the wave coils 12 need only include one crest 14 and one trough 16, the wave coils 12 preferably include more than one crest 14 and more than one trough 16 and will be described as such below.

Figure 4:
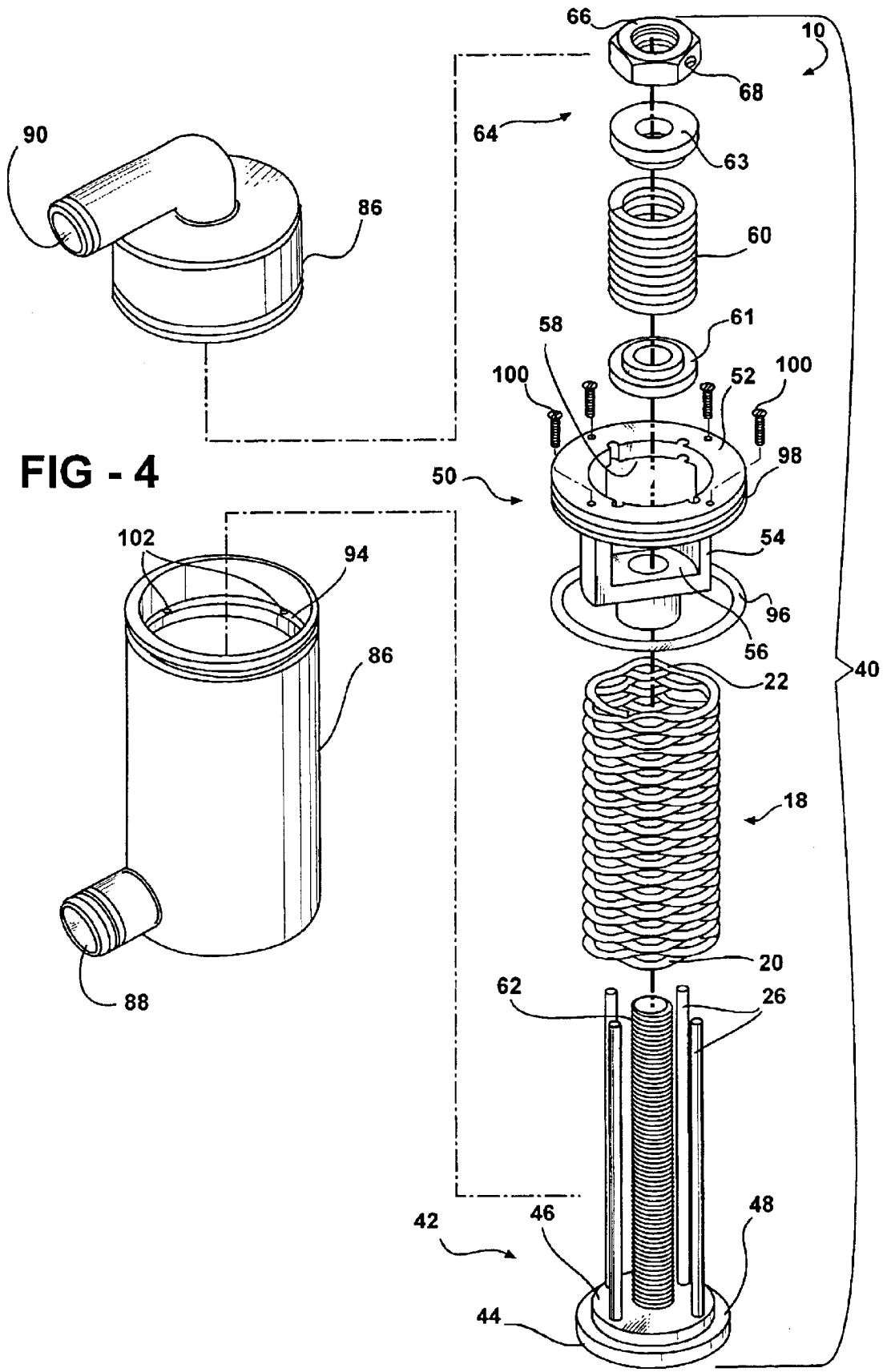
FIG. 4 is an exploded perspective view of the filter assembly in combination with a canister for filtering the fluid.

The filter element 18 includes first 20 and second 22 ends and an inner cavity 24. The filter element 18 also includes a length L extending between the first and second ends 20, 22. The filter assembly 10 of the subject invention incorporates at least one retention post 26, as shown in FIG. 4, that extends through the inner cavity 24 and between the first and second ends 20, 22 of the filter element 18 to maintain the axial arrangement of the wave coils 12. The first end 20 of the filter element 18, as disclosed throughout the Figures, is a bottom end 20 of the filter element 18, and the second end 22 of the filter element 18, as disclosed throughout the Figures, is a top end 22 of the filter element 18. Therefore, the subject description will continue only with reference to the top and bottom ends 20, 22 of the filter element 18. However, the description of the first and second ends 20, 22 of the filter element 18 is not intended to be limiting, and it is to be understood that the first and second ends 20, 22 of the filter element 18 could also be a left and right end of the filter element 18. Also, the diameter, the length L, and the stiffness of the filter element 18 may vary.

As shown in the Figures, the wave coils 12 that define the filter element 18 are preferably a wave spring. As such, the wave coils 12 preferably extend continuously in an endless path through the crests 14 and troughs 16 and between the first and second ends 20, 22 of the filter element 18. It is to be understood that the wave coils 12 are not required to extend continuously. That is, although not preferred, the subject invention may include connecting members, not shown in the Figures, that connect each of the wave coils 12 together. In this embodiment, the wave coils 12 can be said to be segmented. Also, in the preferred embodiment, the wave coils 12 actually extend continuously in a helix through the endless path between the first and second ends 20, 22.

Referring now to FIGS. 3A through 3C, the wave coils 12 include a shearing surface 28. The shearing surface 28 imparts shear forces on the fluid as the fluid is being filtered. Preferably, the shearing surfaces 28 of the wave coils 12 include a plurality of ridges 30 to enhance the shear forces imparted on the fluid being filtered. As shown in FIGS. 3A through 3C, the ridges 30 may be of varying shapes and sizes depending on the purpose for the filter assembly 10. For instance, if shearing of the fluid is the primary purpose, then the ridges 30 having sharp, cone-shaped teeth, as shown in FIG. 3C are ideal. Preferably, the ridges 30 are laser-etched both transversely and sequentially along the wave coils 12, and the ridges 30 are machined to ridge depths on the wave coils 12 of from hundredths of millimicrons to microns. Alternatively, the ridges 30 may be photo-etched.

It is not required that the wave coils 12 be only flat or ridged for shearing purposes. That is, although not preferred, the wave coils 12 may even be formed from round or smooth stock. Furthermore, the wave coils 12 may include a coating for modifying the flow of the fluid being filtered. That is, the wave coils 12 may be coated to adsorb or to repel solutes in the fluid. Such coatings include, but are not limited to, magnetic coatings, hydrophilic coatings, hydrophobic coatings, and specific affinity coatings such as antibodies which have a specific affinity toward a particular antigen such as PCBs. The coatings can assist the wave coils 12 in performing 'micro-filtration' when the filtration apertures are at a 0 micron filtration aperture 34 size, which is described below. The hydrophobic coating is particularly useful throughout industrial applications for the filtering of water, oil, and water/oil mixtures.

The filter assembly 10 also includes a support 32 that engages one of the bottom and top ends 20, 22 of the filter element 18 for supporting the wave coils 12. That is, the support 32 engages either the bottom end 20 or top end 22. The support 32 also diverts the fluid inside or outside of the inner cavity 24 of the filter element 18. In other words, the support 32 also diverts the fluid to one of the inside and outside of the inner cavity 24. Depending on the embodiment, the support 32 functions to divert the fluid inside the inner cavity 24 or to divert the fluid outside the inner cavity 24. The support 32 will be described in further detail below.

The crests 14 of one wave coil 12 engage the trough 16 of an adjacent wave coil 12 to define at least one filtration aperture 34, or a filtration pore, between each crest 14 and each trough 16 of the adjacent wave coils 12. Preferably the filtration aperture 34 is spindle-shaped as disclosed throughout the Figures. In a preferred embodiment, the filter element 18 is 2.25 inches in diameter, the length L is 5 inches, the filter element 18 includes 100 wave coils 12, and each wave coil 12 engages the adjacent wave coil 12 three and one-half times per 360°. Of course, the number of times each wave coil 12 engages the adjacent wave coil 12 can vary. It is to be understood that, with the exception of FIG. 1A, the crests 14 and troughs 16, as well as the at least one filtration aperture 34 defined therebetween, are significantly exaggerated for the descriptive and illustrative purposes of subject invention. As disclosed throughout the Figures, the subject invention preferably includes a plurality of filtration apertures 34, and the subject invention will be described below in terms of the plurality of filtration apertures 34 although more than one filtration aperture 34 is not necessarily required.

The fluid that is diverted by the support 32 is filtered through the filtration apertures 34. This will be described below. For now, if, for example, the filtration apertures 34 had a crest 14-to-trough 16 separation of 500 microns, then any particulates suspended within the fluid that are less than 500 microns will pass through the filtration apertures 34 as a filtrate 36 of the fluid, and any particulates suspended within the fluid that are greater or equal to 500 microns will be retained on the filter element 18 as a retentate 38, or filter cake, of the fluid.

Referring primarily to FIGS. 4 through 7, the filter assembly 10 of the subject invention further includes an adjustment mechanism 40. More specifically, the adjustment mechanism 40 engages at least one of the bottom and top ends 20, 22 of the filter element 18 for modifying the length L, extending between the first and second ends 20, 22 of the filter element 18, to reduce and expand the at least one filtration aperture 34 or the filtration apertures 34. Therefore, the filtration apertures 34 are variably-size filtration aperture 34 because they are adjustable or tunable by the adjustment mechanism 40. The filtration apertures 34 are adjustable, depending on process requirements and the characteristics of the filter element 18, specifically of the wave coils 12, between a maximum filtration aperture 34 size and a 0 micron filtration aperture 34 size. The length L is increased to expand the at least one filtration aperture 34, or to allow the crests 14 and troughs 16 to decompress, and the length L is decreased to reduce the at least one filtration aperture 34, or to compress the crests 14 and troughs 16. Although the adjustment mechanism 40 varies depending on the embodiment, the adjustment mechanism 40 is preferably at least partially disposed in the inner cavity 24 of the filter element 18.

Figure 10B:
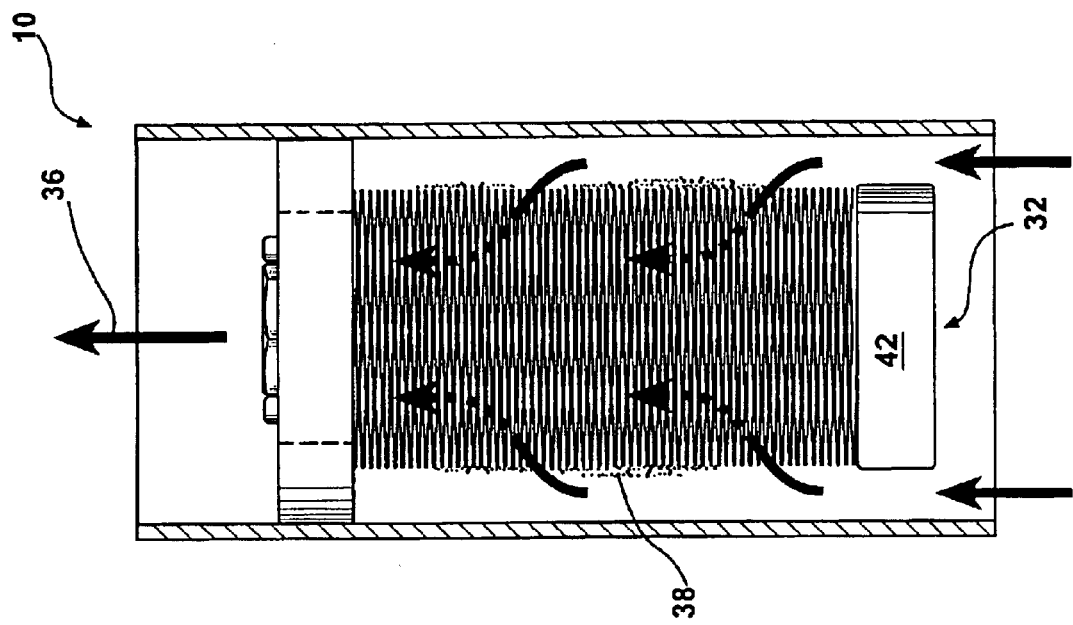
FIG. 10B is a schematic view of the fluid flowing through the outside of the inner cavity such that the filtrate of the fluid flows through the filtration apertures and through the inside of the inner cavity, and the retentate of the fluid is retained on the outside of the inner cavity.
Figure 10A:
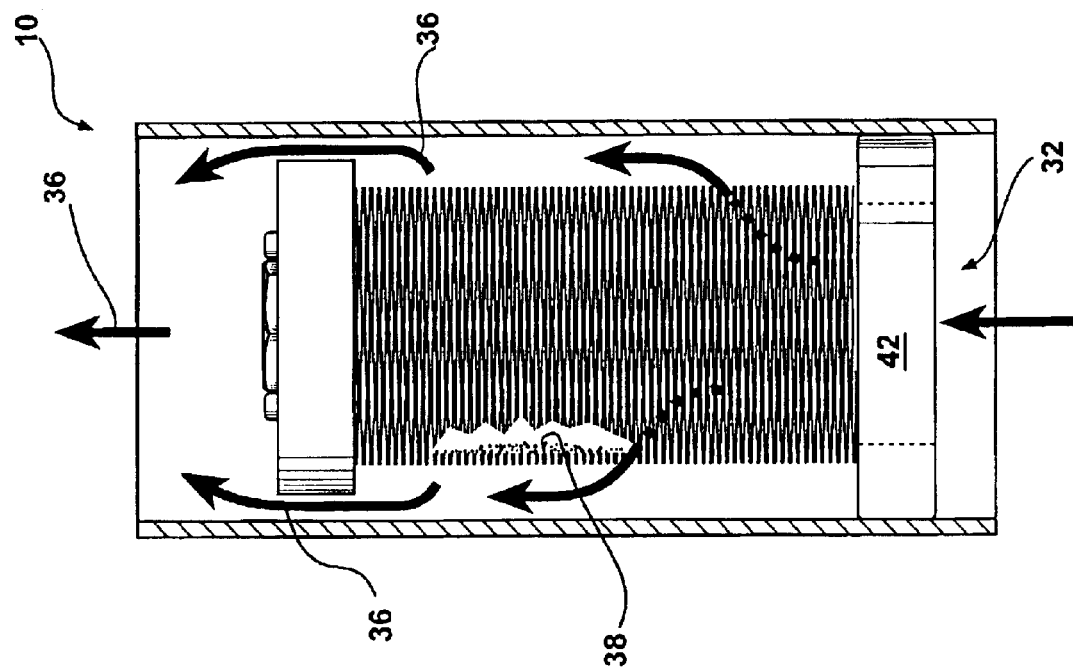
FIG. 10A is a schematic view of the fluid flowing through an inside of the inner cavity such that a filtrate of the fluid flows through the filtration apertures and through an outside of the inner cavity, and a retentate of the fluid is retained on the inside of the inner cavity.

The adjustment mechanism 40 includes a base plate 42 engaging one of the bottom and top ends 20, 22 of the filter element 18. As shown in FIG. 4, the base plate 42 preferably engages the bottom end 20 of the filter element 18. The support 32, introduced above, is further defined as the base plate 42. As such, the base plate 42 supports the wave coils 12 and also diverts the fluid inside or outside of the inner cavity 24 for filtering. As understood by those skilled in the art, in the embodiment where the fluid is first diverted inside of the inner cavity 24, as shown in FIG. 10A, the base plate 42 is preferably a doughnut-shaped plate surrounding the filter element 18 that blocks the outside of the inner cavity 24 such that the fluid can only flow into the inside of the inner cavity 24.

The base plate 42 includes a base collar 44 and a platform 46 extending from the collar 44. The platform 46 of the base plate 42 is at least partially disposed in the inner cavity 24 of the filter element 18. In this position, the platform 46 operates to keep the base plate 42 in engagement with either the bottom end 20 or top end 22 of the filter element 18. The wave coils 12 of the filter element 18 are preferably anchored to the platform 46. A shoulder portion 48 of the base plate 42 is defined between the base collar 44 and the platform 46. The shoulder portion 48 of the base plate 42 actually supports one of the bottom and top ends 20, 22 of the filter element 18. As shown in FIGS. 4 and 5A, the shoulder portion 48 supports the bottom end 20 of the filter element 18.

In the preferred embodiment, the adjustment mechanism 40 further includes a flange member 50 that engages the other of the bottom and top ends 20, 22 of the filter element 18 relative to the base plate 42. The flange member 50, as described in greater detail below, is adjustably engage relative to the base plate 42 for modifying the length L. As such the filtration apertures 34 can be reduced and expanded.

The flange member 50 more specifically includes a flange collar 52 and a yoke 54. The yoke 54 extends from the collar 52 toward the base plate 42. Preferably, the yoke 54 is integrally molded with the flange collar 52 and includes a yoke base segment 56 that is described below. The yoke 54 of the flange member 50 is at least partially disposed in the inner cavity 24 of the filter element 18 to keep the flange member 50 in engagement with the other of the bottom and top ends 20, 22 of the filter element 18 relative to the base plate 42. That is, the yoke 54 keeps the flange member 50 in engagement with the top end 22 of the filter element 18. A shoulder portion 58 of the flange member 50 is defined between the flange collar 52 and the yoke 54. The shoulder portion 58 of the flange member 50 supports the other of the bottom and top ends 20, 22 of the filter element 18 relative to the base plate 42. That is, the shoulder portion 58 of the flange member 50 supports the top end 22 of the filter element 18.

The adjustment mechanism 40 more specifically includes at least one pilot spring 60, preferably a compression spring. As will be described below, the pilot spring 60 subjects the filter assembly 10 to a loading pressure by biasing the flange member 50. The pilot spring 60 is supported on the yoke 54 of the flange member 50. More specifically, the pilot spring 60 is supported on the base segment 56 of the yoke 54 and is further supported by first and second washers 61, 63. The base segment 56 of the yoke 54 defines an opening, not numbered, and the pilot spring 60 is supported on the base segment 56 of the yoke 54 about the opening. In this position, the pilot spring 60 biases the flange member 50 to decrease the length L of the filter element 18 and reduce the filtration apertures 34, and the pilot spring 60 biases the flange member 50 to increase the length L of the filter element 18 and expand the filtration apertures 34.

The adjustment mechanism 40 of the filter assembly 10 further includes an adjustment shaft 62. As disclosed throughout the Figures, the adjustment shaft 62 extends from the base plate 42 to engage the flange member 50 such that the flange member 50 is adjustable relative to the base plate 42. More specifically, the adjustment shaft 62 extends from the base plate 42 through the opening and the pilot spring 60 to engage the flange member 50 such that the flange member 50 is adjustable relative to the base plate 42. As such, the length L of the filter element 18, as described above, can be modified. Preferably, the adjustment shaft 62 extends from the base plate 42 though the inner cavity 24 of the filter element 18 to engage the flange member 50. Also in the preferred embodiment, the adjustment shaft 62 is threaded and is integrally molded with the base plate 42. It is to be understood that the adjustment shaft 62 may alternatively include locking teeth or detents, as opposed to threads. In certain embodiments of the subject invention, the adjustment shaft 62 can be rendered electromagnetic such that the wave coils 12 are magnetically-induced by the adjustment shaft 62 to adsorb a fluid having magnetic particles. This electro-magnetized adjustment shaft 62 is preferably used throughout various medical applications including, but not limited to, blood separation applications where cellular and viral components are removed from blood using magnetic antibodies.

To make the flange member 50 adjustable relative to the base plate 42, the subject invention includes an adjustable lock 64 that engages the adjustment shaft 62. More specifically, the adjustable lock 64 is disposed on the adjustment shaft 62, adjacent the spring 60 and opposite the base segment 56 of the flange member 50, for adjusting the flange member 50 relative to the base plate 42 to modify the length L. Manipulation of the adjustable lock 64 directly causes the spring 60 to bias the flange member 50. In the preferred embodiment, the adjustable lock 64 is a threaded adjustment nut 66 that is disposed on the threaded adjustment shaft 62. In alternative embodiments, the adjustable lock 64 may be designed to engage and lock locking teeth or detents on the adjustment shaft 62. As shown in FIG. 4, a set screw 68 may extend through the adjustable lock 64 to the adjustment shaft 62 to ensure that the adjustable lock 64 is locked on the adjustment shaft 62 for retaining the flange member 50 in an adjusted position relative to the base plate 42.

When operating the adjustable lock 64 to reduce the filtration apertures 34, the lock is tightened on the adjustment shaft 62. The pilot spring 60 exerts a compressive force on the flange member 50 which, in turn, exerts a compressive force on the filter element 18. As understood by those skilled in the art, the strength of the pilot spring 60, i.e., the weight required to compress the pilot spring 60, must exceed the strength of the wave coils 12, i.e., the weight required to compress the wave coils 12, that define the filter element 18. For example, the strength of the pilot spring 60 could be 32 pounds and the strength of the wave coils 12 could be 25 pounds. In such an example, when the adjustable lock 64 is tightened, pressure is applied to the stronger pilot spring 60 which transfers the compressive pressure to the weaker wave coils 12 of the filter element 18 thereby reducing the filtration apertures 34. The opposite occurs when the adjustable lock 64 is loosened on the adjustment shaft 62. The reduction and expansion of the filtration apertures 34 may be calibrated by developing a linear plot of the rotations of the adjustable lock 64 versus the size of the filtration apertures 34.

Figure 7:
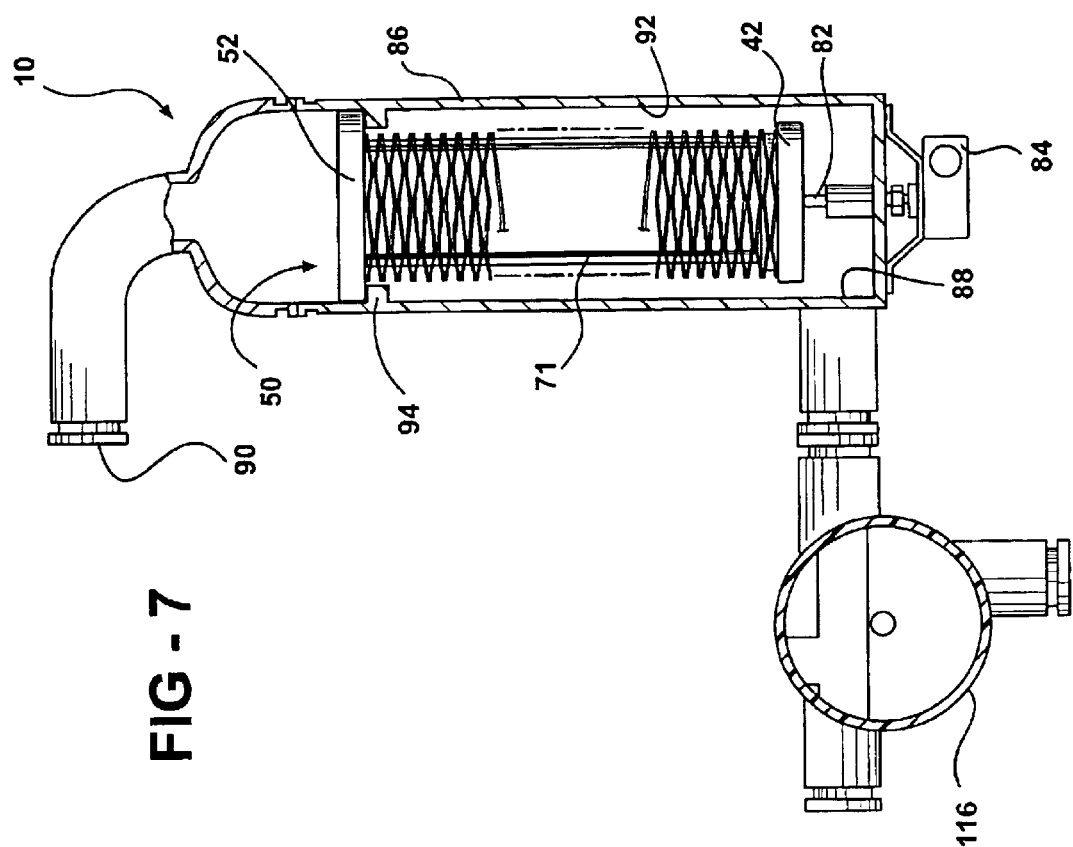
FIG. 7 is a partially cross-sectional side view of the filter assembly disposed in the filter canister illustrating a further alternative adjustment mechanism including a motor for automatically modifying the length L of the filter element to automatically reduce and expand the filtration apertures.
Figure 6A:
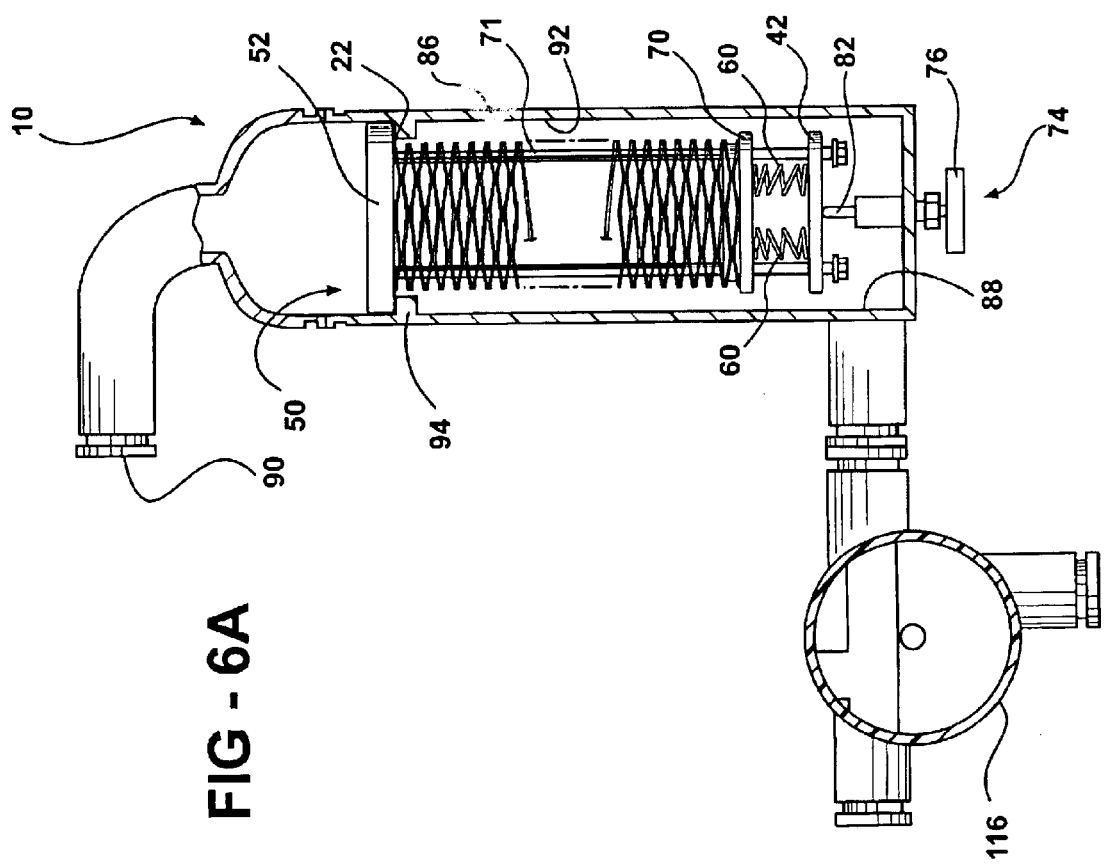
FIG. 6A is a partially cross-sectional side view of the filter assembly disposed in the filter canister illustrating an alternative adjustment mechanism including a manual adjustment assembly for modifying a length L of the filter element to reduce and expand the filtration apertures.

In alternative embodiments of the subject invention, disclosed in FIGS. 6A, 6B, and 7, the adjustment mechanism 40 varies. Referring now to FIG. 6A, the flange member 50 only includes a flange collar 52, i.e., the yoke 54 is not a functioning component of the flange member 50. Instead, the flange collar 52 acts as a fixed plate, not numbered, engaging the other of the bottom and top ends 20, 22 of the filter element 18 relative to the base plate 42. That is, in this embodiment, the fixed plate engages the top end 22 of the filter element 18. In this embodiment, the flange member 50 also includes a sliding plate 70, also known as a floating plate. As described in the orientation disclosed in FIG. 6A, the sliding plate 70 is disposed between the base plate 42 and the fixed plate. The base plate 42 is adjustable. More specifically, the sliding plate 70 is supported above the base plate 42 by one or more pilot springs 60. The sliding plate 70 is adjustably engaged relative to the fixed plate for modifying the length L of the filter element 18 to reduce and expand the filtration apertures 34. Preferably, the sliding plate 70 is adjustable relative to the fixed plate along side posts 71 which may, or may not be, the same as the retention posts 26. Preferably, a controller 72, as shown in FIG. 9, is in communication with the sliding plate 70 of this alternative adjustment mechanism 40 to automatically adjust the sliding plate 70 relative to the fixed plate. Other functions of the controller 72 will be described below.

In contrast to automatic adjustment accomplished, in part, with the controller 72, a manual adjustment assembly 74, shown generally in FIG. 6A and more specifically in FIG. 6B, may be used to modify the length L of the filter element 18. More specifically, the manual adjustment assembly 74. The assembly 74 includes an adjustment handle 76. The adjustment handle 76 rotates a handle adjustment nut 78, preferably a packing nut. The adjustment handle 76, through rotation of the handle adjustment nut 78, contacts a packing spring 80 to advance or pull-back a drive rod 82. As shown in the Figures, the drive rod 82 is in direct contact with the base plate 42 and is in indirect contact with the sliding plate 70 via the pilot springs 60. Of course, it is to be understood that a number of turns of the adjustment handle 76 can be correlated to the size of the filtration apertures 34.

Referring now to FIG. 7, the subject invention includes a motor 84, selectively activated by the controller 72, refer to FIG. 9, to automatically adjust the adjustment mechanism 40. It is to be understood that the motor 84 can be selectively activated by the controller 72 in response to various forms of data including, but not limited to, flow data, pressure data, solids loading data, time data, and particle size distribution data. In the alternative embodiment for the adjustment mechanism 40 disclosed in FIG. 7, the sliding plate 70 is eliminated as well as the pilot springs 60. Instead, the drive rod 82 of the adjustment mechanism 40 is rigidly fixed, as through a weld or screw end, directly to the base plate 42 that supports the filter element 18. The base plate 42 is adjustable. In this embodiment, referred to as 'direct drive,' the motor 84 preferably has two settings, a maximum setting for controlling the size of the filtration apertures 34 during filtering, and a minimum setting for expanding the filtration apertures 34 during automatic backwashing, which is described below. Of course, in either of the embodiments disclosed in FIGS. 6A and 7, the manual adjustment assembly 74 and the motor for automatically adjusting the adjustment mechanism 40 can be interchanged.

The filter assembly 10 of the subject invention is utilized in combination with a filter canister 86. The filter canister 86 includes an inlet 88 for receiving the fluid to be filtered and an outlet 90 for delivering the fluid that has been filtered. As shown in FIG. 5A, the inlet 88 of the filter canister 86 is preferably oval-shaped to impart a vortex onto the fluid received into the filter canister 86 for filtering. The vortex imparted by the oval-shaped inlet 88 is effective in exposing the fluid to the filter element 18. The vortex also maintains the retentate 38 toward an inner wall 92 of the filter canister 86 and away from the filtration apertures 34 as long as possible. The canister 86 may also include internal blades, baffles, and the like to encourage a vortex and more effectively expose the fluid to the filter element 18.

The filter assembly 10, and in particular the filter element 18 of the filter assembly 10, is disposed in the filter canister 86. More specifically, the filter canister 86 includes a shelf 94 for supporting the filter assembly 10 in the filter canister 86. A gasket 96, such as an O-ring, is disposed about the flange member 50 to mate with the shelf 94 of the filter canister 86. As such, the outlet 90 of the filter canister 86 is sealed from the inlet 88 of the filter canister 86. More specifically, the flange collar 52 of the flange member 50 includes a machined depression 98. The gasket 96 is disposed in the machined depression 98 to ensure that the filter assembly 10 fits tightly into the shelf 94 of the filter canister 86. The gasket 96 presses against the inner wall 92 of the filter canister 86 such that outlet 90 of the filter canister 86 is sealed from the inlet 88 of the filter canister 86. Furthermore, a plurality of fastening screws 100 extend through the flange collar 52 and into threaded inserts 102 in the shelf 94 of the filter canister 86. Once the filter element 18 and flange member 50, including the flange collar 52, are inserted into the filter canister 86, the fastening screws 100 are tightened to rigidly maintain the filter assembly 10 on the shelf 94. Rigid maintenance of the filter assembly 10 on the shelf 94 ensures that the outlet 90 and inlet 88 of the filter canister 86 are sealed, resists movement of the filter assembly 10 during activation of the adjustment mechanism 40 to modify the length L, and resists movement of the filter assembly 10 during automatic backwashing of the filter assembly 10, which is described below.

Referring now to FIGS. 8A, 8B, and 9, the subject invention preferably incorporates a plurality of the filter assemblies 10. The plurality of filter assemblies 10 are disclosed in a nested configuration in FIGS. 8A and 8B. That is, at least one filter assembly 10 included in the plurality of filter assemblies 10 is disposed concentrically about another filter assembly 10 of the plurality. In this nested configuration, a coarse filter assembly 10A is disposed within a fine filter assembly 10B. Of course, it is to be understood that any number of filter assemblies 10 may be nested with each other.

This embodiment also includes baffle cages 104 that support at least one baffle 106. The baffle cages 104, supporting the baffles 106, are disposed within the inner cavity 24 of the filter element 18 of a particular filter assembly 10. The baffles 106 provide structural support to the filter elements 18 and are preferably angled so as to direct the fluid that is being filtered toward the filtration apertures 34. As shown in FIG. 8B, the baffles 106 are preferably hollow such that a filtration additive can be delivered to the filtration apertures 34 through the baffles 106. One suitable filtration additive, steam, enhances the filtering, or other stripping, of the fluid that is being filtered. Other suitable filtration additives include oxygen for bioprocessing capabilities. Additionally, a plurality of beads 108 may be disposed within the inner cavities 24 of the filter elements 18 for increasing a surface area of the fluid that is exposed for filtering. The beads 108 are preferably used in combination with baffles 106 that are hollow because the beads 108 are particularly effective in exposing the fluid to be filtered to the filtration additive.

As shown in FIG. 9, the filter assemblies 10 can be arranged in parallel P and/or in series S depending on various process requirements. The plurality of filter assemblies 10 can also be arranged in a pyramid sequence. The purpose of the pyramid sequence is to utilize more than one filter assembly 10 having different filtration aperture 34 sizes to segregate coarse solid particles from intermediate and fine solid particles where the filtration apertures 34 would otherwise become immediately 'blinded.' The pyramid sequence is represented in FIG. 9 by the filtration aperture 34 sizes of 125 microns, 50 microns, and 25 microns. Of course, it is to be understood that such a pyramid sequence may be continuously altered to accommodate suspended particle size distribution and also to equalize flow rates across the filter assemblies 10.

As shown schematically in FIG. 9, the controller 72 is in communication with the filter assemblies 10, in particular with the adjustment mechanisms 40 of each filter assembly 10. The controller 72 is also in communication with pressure 110, temperature 112, and flow sensors 114, and with the valves, shown schematically, in FIG. 9. The adjustment mechanism 40 can automatically modify the length L of the filter element 18 to automatically reduce and expand the filtration apertures 34 as needed. The automatic modification of the length L is primarily facilitated by at least one pressure sensor 110 that is in communication with the controller 72. The pressure sensor 110 communicates with the controller 72, and the controller 72 activates the adjustment mechanism 40, preferably through the motor 84, to automatically reduce and expand the filtration apertures 34.

As shown in FIGS. 5A, 5B, 6A, 7, and 9, an inlet valve 116 is disposed at the inlet 88 of the filter canister 86 and an outlet valve 118 is disposed at the outlet 90 of the filter canister 86. The outlet valve 118 will be described further below. The inlet valve 116 isolates the filter canister 86 from the fluid to be filtered when necessary such as upon automatic backwashing as described below. The controller 72 is in communication with the inlet valve 116 to open and close the valve 116 and accomplish this isolation. Referring to FIGS. 5A and 5B, the inlet valve 116 is preferably a three-way inlet valve 116. In a filtering position of the three-way inlet valve 116, as disclosed in FIG. 5A, the inlet valve 116 allows the fluid that is to be filtered to flow through the valve 116 and into the inlet 88 of the filter canister 86 for filtering. However, in a backwash position 120 of the three-way inlet valve, as disclosed in FIG. 5B, the inlet valve 116 isolates the filter canister 86 from the fluid to be filtered. Instead, as will be described below, the retentate 38 of the fluid is able to flow through the inlet valve 116 when the inlet valve 116 is in the backwash position 120.

Preferably, there is a first pressure sensor 122 disposed at the inlet 88 of the filter canister 86 and a second pressure sensor 124 disposed at the outlet 90 of the filter canister 86. The first pressure sensor 122 determines an inlet pressure and the second pressure sensor 124 determines an outlet pressure. The fist and second pressure sensors 122, 124 are in communication with the controller 72. A difference between the inlet pressure and the outlet pressure, which can be determined by the controller 72, establishes a pressure differential. In reliance on this pressure differential, the controller 72 can activate the inlet valve 116 to isolate the filter canister 86 from the fluid to be filtered. More specifically, the controller 72 can activate the inlet valve 116 to isolate the filter canister 86 when the outlet pressure is less than the inlet pressure by a predetermined amount.

The method of filtering the fluid according to the subject invention includes the step of flowing the fluid toward the support 32 of the filter assembly 10. In the context of the preferred embodiment, the fluid flows toward the base plate 42 of the adjustment mechanism 40 operating as the support 32. The base plate 42 diverts the fluid inside or outside the inner cavity 24 of the filter element 18. Once inside or outside the inner cavity 24, the diverted fluid is filtered through the filtration apertures 34 defined between the crests 14 and the troughs 16. As such, the filtrate 36 of the fluid passes through one of the inside or outside of the inner cavity 24 and the retentate 38 of the fluid is retained on the other of the inside or outside of the inner cavity 24 relative to the filtrate 36. That is, the filtrate 36 passes through either the inside or outside of the inner cavity 24 and the retentate 38 is retained on the opposite side of the inner cavity 24 of the filter element 18 relative to the filtrate 36.

Referring now to FIG. 10A, if the fluid flows toward the base plate 42 and is diverted to the inside of the inner cavity 24 and then through the filtration apertures 34, then the filtrate 36 of the fluid, which also flows through the filtration apertures 34, passes through the outside of the inner cavity 24 to the outlet 90 of the filter canister 86, and the retentate 38 of the fluid, which cannot flow through the filtration apertures 34, is retained on the inside of the inner cavity 24 of the filter element 18. As described above, in this embodiment, the base plate 42 is preferably the doughnut-shaped plate surrounding the filter element 18 that blocks the outside of the inner cavity 24 such that the fluid can only flow into the inside of the inner cavity 24. Alternatively, as shown in FIG. 10B, if the fluid flows toward the base plate 42 and is diverted to the outside of the inner cavity 24 and then through the filtration apertures 34, then the filtrate 36 of the fluid flows through the filtration apertures 34 and passes through the inside of the inner cavity 24 to the outlet 90 of the filter canister 86, whereas the retentate 38 of the fluid is retained on the outside of the inner cavity 24 of the filter element 18.

The method of filtering utilizing the filter assembly 10 according to the subject invention also includes the step of adjusting the filter assembly 10 to reduce and expand the filtration apertures 34. It is to be understood that the step of adjusting the filter assembly 10 is preferably accomplished with the adjustment mechanism 40 in communication with the pressure sensor or sensors 110, 122, 124 and the controller 72 as described above.

The method further includes the step of cleaning the filter assembly 10. The most preferred manner in which to clean the filter assembly 10 is by automatically backwashing the filter assembly 10 by momentarily reversing the flow of the filtrate 36, or another fluid, as described immediately below. To automatically backwash the filter assembly 10, the filter assembly 10 is isolated from the fluid to be filtered. To isolate the filter assembly 10 from the fluid to be filtered, the inlet valve 116 at the inlet 88 of the filter canister 86 is closed. In the preferred embodiment, the inlet valve 116 is activated into the backwash position 120. Once the filter assembly 10 is isolated from the fluid to be filtered, the filtrating apertures 34 are expanded. The filtration apertures 34 may be expanded at regularly-defined time intervals or according to other process parameters as described above. However, the filtration apertures 34 are preferably automatically expanded in response to the pressure differential between the bottom and top ends 20, 22 of the filter element 18. That is, the filtration apertures 34 are preferably automatically expanded when the pressure differential exceeds the predetermined amount such as when the outlet pressure is less than the inlet pressure by the predetermined amount. Once the filter assembly 10 is isolated, the adjustment mechanism 40 increases the length L of the filter element 18 to expand the filtration apertures 34. In the most preferred embodiment, the threaded adjustment nut 66 is automatically loosened on the threaded adjustment shaft 62 and the length L of the filter element 18 automatically expands.

Once the filtration apertures 34 are expanded, the flow of the fluid that has been filtered, i.e., the filtrate 36, is reversed such that the filtrate 36 flows back through the filtration apertures 34 and the retentate 38 of the fluid is automatically dislodged from the inside or the outside of the inner cavity 24, depending on the embodiment. It is also to be understood that the flow of the filtrate 36 may be reversed at the same time, or even before, the filtration apertures 34 are expanded. Of course, as the retentate 38 is automatically dislodged, the backwash position 120 of the preferred three-way inlet valve allows the dislodged retentate 38 to flow to a retentate 38 collection reservoir that collects the backwashed retentate 38. Once the filter assembly 10 is clean, the flow of the filtrate 36 returns to normal.

Alternatively, the outlet valve 118 at the outlet 90 of the filter canister 86 may be a three-way outlet valve 118, similar to the three-way inlet valve 116. As such, this three way outlet valve 118 can be manipulated to a position such that a second fluid, distinct from the fluid that has been filtered, i.e., the filtrate 36, can be utilized to flow back through the filtration apertures 34 to automatically backwash the filter assembly 10 by dislodging the retentate 38. In this situation, the filtrate 36 is not used to automatically backwash the filter assembly 10. In this embodiment, the three-way outlet valve 118 allows the filter canister 86 to selectively receive fluid for back-washing the filter element 18 when the outlet pressure is less than the inlet pressure by the predetermined amount as communicated by the controller 72.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims. Furthermore, the reference numerals are merely for convenience and are not to be in any way to be read as limiting.

What is claimed is:

1. A filter assembly for filtering a fluid, said assembly comprising:
    a plurality of wave coils arranged axially to define a filter element having first and second ends and an inner cavity;
    a support engaging one of said first and second ends for supporting said wave coils and for diverting the fluid inside or outside said inner cavity of said filter element;
    each of said wave coils including at least one crest and at least one trough with said at least one crest of one wave coil engaging said at least one trough of an adjacent wave coil to define at least one filtration aperture between each crest and each trough of adjacent wave coils for filtering the fluid diverted by said support;
    a base plate engaging one of said first and second ends of said filter element; and
    a flange member engaging the other of said first and second ends relative to said base plate, said flange member being adjustably engaged relative to said base plate for modifying a length L, extending between said first and second ends of said filter element, to reduce and expand said at least one filtration aperture;
    wherein said flange member comprises a flange collar and a yoke extending from said collar toward said base plate thereby defining a shoulder portion of said flange member between said flange collar and said yoke, said shoulder portion of said flange member supporting the other of said first and second ends of said filter element relative to said base plate.

2. A filter assembly as set forth in claim 1 wherein said yoke is integrally molded with said flange collar.

3. A filter assembly as set forth in claim 1 wherein said yoke of said flange member is at least partially disposed in said inner cavity of said filter element to keep said flange member in engagement with the other of said first and second ends of said filter element relative to said base plate.

4. A filter assembly as set forth in claim 1 wherein said adjustment mechanism further comprises at least one pilot spring supported on said yoke of said flange member for biasing said flange member to decrease said length L to reduce said at least one filtration aperture and for biasing said flange member to increase said length L to expand said at least one filtration aperture.

5. A filter assembly as set forth in claim 4 wherein said pilot spring is further defined as a compression spring.

6. A filter assembly as set forth in claim 4 wherein said yoke of said flange member comprises a base segment defining an opening and said pilot spring is supported on said base segment of yoke about said opening.

7. A filter assembly as set forth in claim 6 wherein said adjustment mechanism further comprises an adjustment shaft extending from said base plate through said opening and said pilot spring to engage said flange member such that said flange member is adjustable relative to said base plate for modifying said length L of said filter element.

8. A filter assembly as set forth in claim 7 wherein said adjustment mechanism further comprises an adjustable lock disposed on said adjustment shaft adjacent said pilot spring and opposite said base segment of said flange member, said adjustable lock causing said spring to bias said flange member for reducing and expanding said at least one filtration aperture.

* * * * *